United States Patent
Kumar et al.

(10) Patent No.: US 12,267,211 B2
(45) Date of Patent: Apr. 1, 2025

(54) DETERMINING METRICS INCLUDING RESOURCE EXPENDITURES OF A DIGITAL SERVICE

(71) Applicant: ServiceNow, Inc., Santa Clara, CA (US)

(72) Inventors: Abhishek Kumar, Jharkhand (IN); Aakash Umeshbhai Bhagat, Surat (IN); Atul Gupta, Bangalore (IN); Ramkumar Devanathan, Bangalore (IN); Shruti Jain, Jalgaon (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/210,316

(22) Filed: Jun. 15, 2023

(65) Prior Publication Data

US 2024/0422058 A1    Dec. 19, 2024

(51) Int. Cl.
H04L 41/0826    (2022.01)
H04L 41/0896    (2022.01)

(52) U.S. Cl.
CPC ...... H04L 41/0826 (2013.01); H04L 41/0896 (2013.01)

(58) Field of Classification Search
CPC ............. H04L 41/0826; H04L 41/0896; H04L 41/142
USPC ........................................................ 709/224
See application file for complete search history.

(56) References Cited

U.S. PATENT DOCUMENTS

| | | | |
|---|---|---|---|
| 11,354,162 B2 * | 6/2022 | Ganteaume | H04L 67/1004 |
| 2009/0276771 A1 * | 11/2009 | Nickolov | G06Q 30/04 718/1 |
| 2014/0236680 A1 * | 8/2014 | Chen | G06Q 10/00 705/7.36 |
| 2018/0321927 A1 * | 11/2018 | Borthakur | G06F 21/105 |
| 2020/0214175 A1 | 7/2020 | Anglin Williams | |
| 2020/0258092 A1 * | 8/2020 | Sica | G06Q 30/0206 |
| 2020/0314174 A1 * | 10/2020 | Dailianas | G06F 9/45558 |
| 2020/0314175 A1 * | 10/2020 | Dailianas | G06Q 30/0283 |

(Continued)

FOREIGN PATENT DOCUMENTS

WO    WO-2022100534 A1 *    5/2022

OTHER PUBLICATIONS

Author unknown, "Cloud Insights admin guide", retrieved from: <https://docs.servicenow.com/bundle/tokyo-it-asset-management/page/product/cloud-insights/concept/cloud-insights-admin-guide.html#>, last updated Aug. 4, 2022.

(Continued)

*Primary Examiner* — Ruolei Zong

(74) *Attorney, Agent, or Firm* — FLETCHER YODER PC

(57) ABSTRACT

In various embodiments, a process for determining metrics including resource expenditures of a digital service includes discovering a plurality of configuration items of a computing infrastructure. The process includes identifying a subset of the plurality of configuration items utilized to provide a digital service, obtaining a plurality of resource expenditures respectively associated with at least a portion of the plurality of configuration items, and associating a subset of the plurality of resource expenditures with the subset of the plurality of configuration items. The process includes aggregating the subset of the plurality of resource expenditures to generate a metric of the digital service.

21 Claims, 8 Drawing Sheets

(56) References Cited

U.S. PATENT DOCUMENTS

2022/0083242 A1* 3/2022 Szczepanik ........... G06F 3/0653

OTHER PUBLICATIONS

Author unknown, "Exploring Cloud Discovery", retrieved from <https://docs.servicenow.com/bundle/tokyo-it-operations-management/page/product/discovery/concept/cloud-discovery-wizard.html>, Nov. 15, 2022.
Author unknown, "Understanding Service Mapping", retrieved from <https://docs.servicenow.com/en-us/bundle/utah-it-operations-management/page/product/service-mapping/concept/service-mapping-get-started.html>, Feb. 2, 2023.

* cited by examiner

Monthly Cost Details for Application Configuration Items

| Configuration Item | Monthly Cost | Monthly Billing Date | Service Account | Region | Cloud Category |
|---|---|---|---|---|---|
| /subscriptions/ resourcegrps/LB1 | 0.15 | 1st of the month | Vendor A | West US | Load Balancer |
| /subscriptions/ resourcegrps/LB2 | 305.05 | 1st of the month | Vendor A | West US | Load Balancer |
| dbdemo1@exampl esqlserver | 6180.75 | 5th of the month | Vendor B | East US | SQL Database |
| /subscriptions/ resourcegrps/VM1 | 6365.05 | 15th of the month | Vendor C | West US | Virtual Machine |
| /subscriptions/ resourcegrps/VM2 | 1090.67 | 1st of the month | Vendor C | West US | Bandwidth |

FIG. 5

Rightsizing Recommendations for Application Configuration Items

| Configuration Item | Provider | Current Size | Recommended Size | Monthly Savings |
|---|---|---|---|---|
| dbdemo1@examplesql server | Vendor A | SQL DB Gen 2.2 | SQL DB Gen 2 | 55.179 |
| dbdemo2@examplesql server | Vendor A | SQL DB Gen 2.2 | SQL DB Gen 2 | 48.41 |
| dbdemo3@examplesql server | Vendor A | SQL DB Gen 2.2 | SQL DB Gen 2 | 41.35 |

FIG. 6

Time of Use Recommendations for Application Configuration Items

| Configuration Item | Provider | Region | Schedule | Monthly Savings |
|---|---|---|---|---|
| /subscriptions/resourcegrps/VM/cloudp3 | Vendor A | West US | 24 x 7 | 0.0553 |
| /subscriptions/resourcegrps/LB/cloudsvcLB | Vendor B | East US | 8am-10pm weekdays | 0.0545 |
| /subscriptions/resourcegrps/VM/uswpflkaweb02 | Vendor A | East US | 8am-5pm weekdays | 0.0757 |
| /subscriptions/resourcegrps/VM/uswpflkaweb02 | Vendor C | East US | 8am-5pm weekdays excluding holidays | 0.0855 |

FIG. 7

DETERMINING METRICS INCLUDING RESOURCE EXPENDITURES OF A DIGITAL SERVICE

BACKGROUND OF THE INVENTION

Enterprise customers and users (such as IT administrators) may wish to know the resource expenditures (e.g., cost) of various configuration items (CIs) of a computing infrastructure. Attendant questions include whether the resource expenditures are appropriate or can be optimized, and if so, how the optimizations can be performed. However, it is challenging to calculate resource expenditures. For example, if a resource is shared, it may be difficult to determine how to apportion the costs between the sharing entities. Certain techniques provide billing information for cloud resources on the CI level. However, these techniques do not provide metrics at a service level (e.g., for an independent application/product).

BRIEF DESCRIPTION OF THE DRAWINGS

Various embodiments of the invention are disclosed in the following detailed description and the accompanying drawings.

FIG. 5 is a diagram illustrating an embodiment of a generated metric of a digital service.

FIG. 6 is a diagram illustrating an embodiment of a rightsizing recommendation for a digital service.

FIG. 7 is a diagram illustrating an embodiment of a time of use recommendation for a digital service.

DETAILED DESCRIPTION

Figure 1:
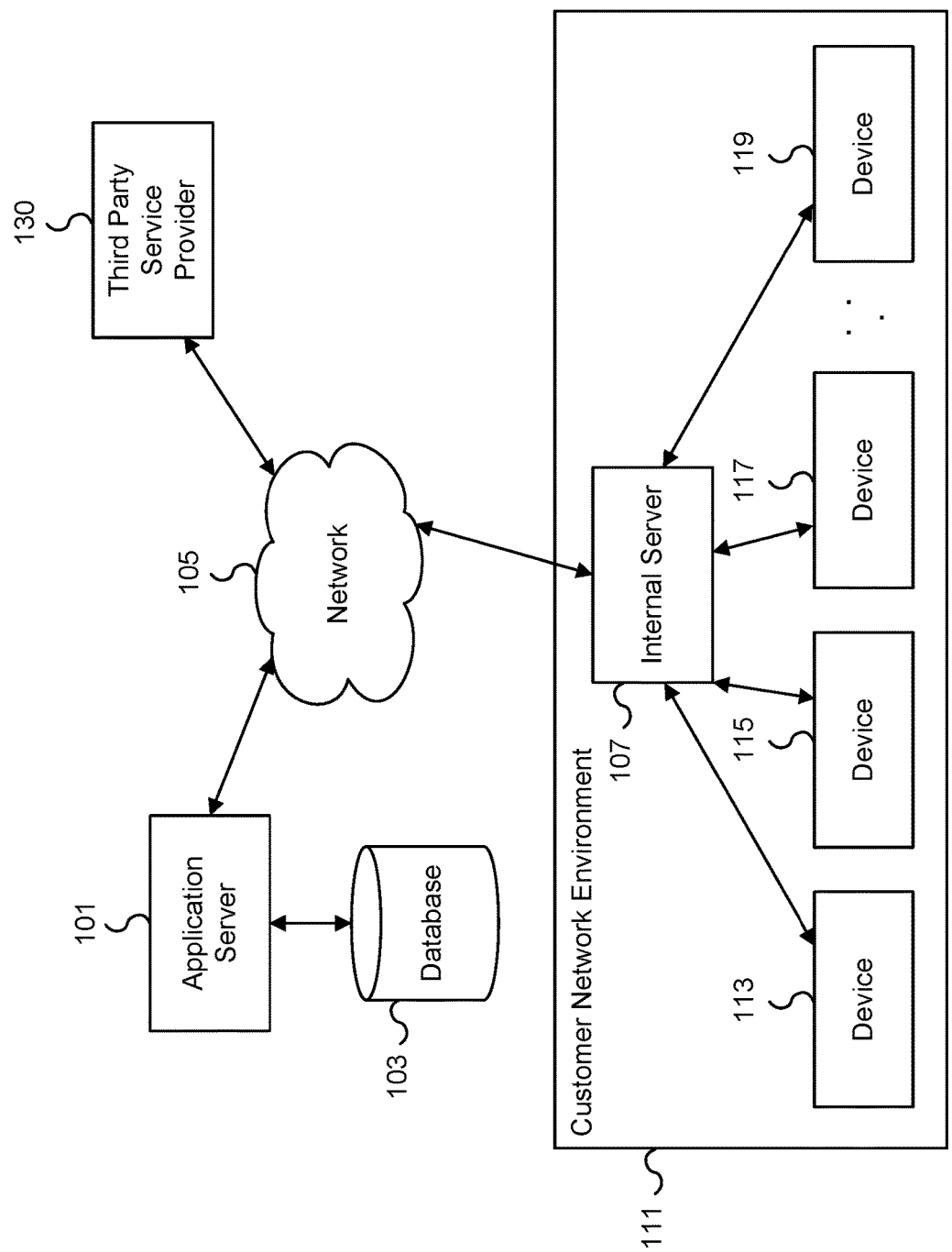
FIG. 1 is a block diagram illustrating a network environment for determining metrics including resource expenditures of a digital service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for determining metrics including resource expenditures of a digital service are disclosed. As used herein, a "digital service" refers to any functionality or service that can be provided by a computer. For example, a digital service may include an application cloud service, as further described herein. As used herein, a "configuration item" (CI) refers to a computer, device, software, or service that is used to provide the digital service. By way of non-limiting example, a CI is a central processing unit (CPU), graphical processing unit (GPU), disk, storage volume, virtual machine (VM), or load balancer. At least some of the CIs may be provided by a dedicated cloud service provider such as a third-party service provider, where the third-party is an entity different from an application server and a customer/client. Each of the CIs may have associated resource expenditures such as computational or other costs including memory, power, processing cycles, subscription/usage fees, or the like. The third-party service providers may report resource expenditures.

An example of a digital (application) service is a human resources portal that employees can use to find information regarding benefits, log vacation time, or the like. Currently, it is difficult for the provider of the digital service to identify the specific cost of providing this service because several digital services may share underlying infrastructure, among other things. Correspondingly, it may be difficult to make decisions with respect to the service, such as knowing whether the cost of providing the service outweighs the benefits, whether the service should be running on-premises or in the cloud (moved to a SaaS provider), etc. The disclosed techniques provide accurate and detailed information about the cost of providing the service by identifying infrastructure components underlying the service, determining metrics, and (optionally) making recommendations based on the metrics.

Metrics of a digital service are determined by discovering one or more configuration items, determining application mappings to identify those CIs that are used to provide a digital service, and obtaining a report of resource expenditures of the CIs. Individual component resource expenditures can be attributed to the subset of the CIs utilized to provide the digital service. Using the example of features provided by ServiceNow, CIs may be discovered using Cloud Discovery, application mappings may be determined using Service Mapping, and resource expenditures can be determined using Cloud Insights.

Technical challenges addressed by the disclosed techniques include ensuring fresh data (e.g., maintaining consistency between cloud services and application mappings), and making recommendations by keeping track of a history of the computing infrastructure and cost changes over time. The metrics can be output on a graphical user interface and/or used to make recommendations such as rightsizing (e.g., changing the type of product used), changing hours of use, service migration, among other things. For example, recommendations associated with service migration include choosing different vendors or service providers compared with a current set of vendors or service providers.

Figure 2:
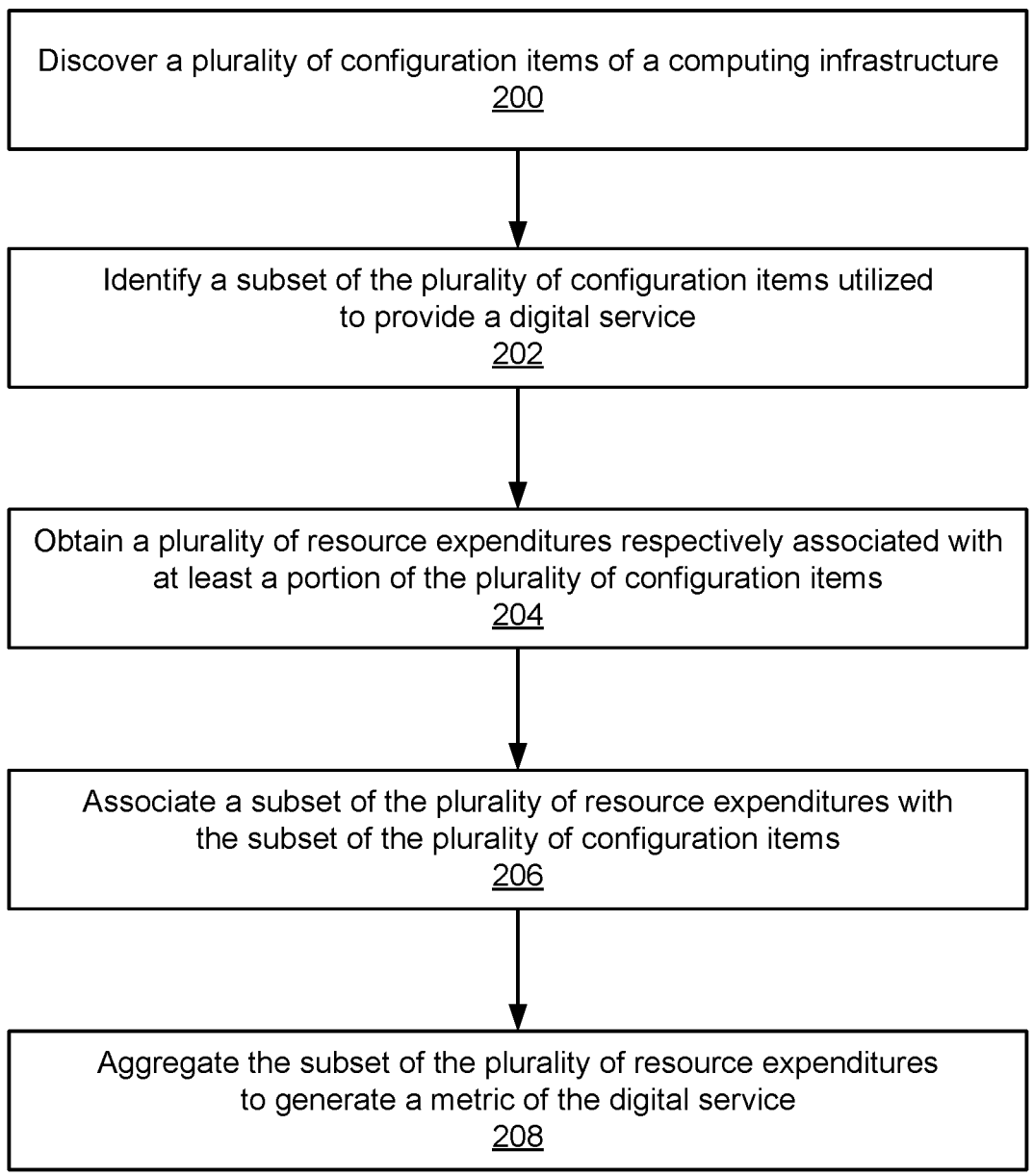
FIG. 2 is a flow diagram illustrating an embodiment of a process for determining metrics including resource expenditures of a digital service.
Figure 3:
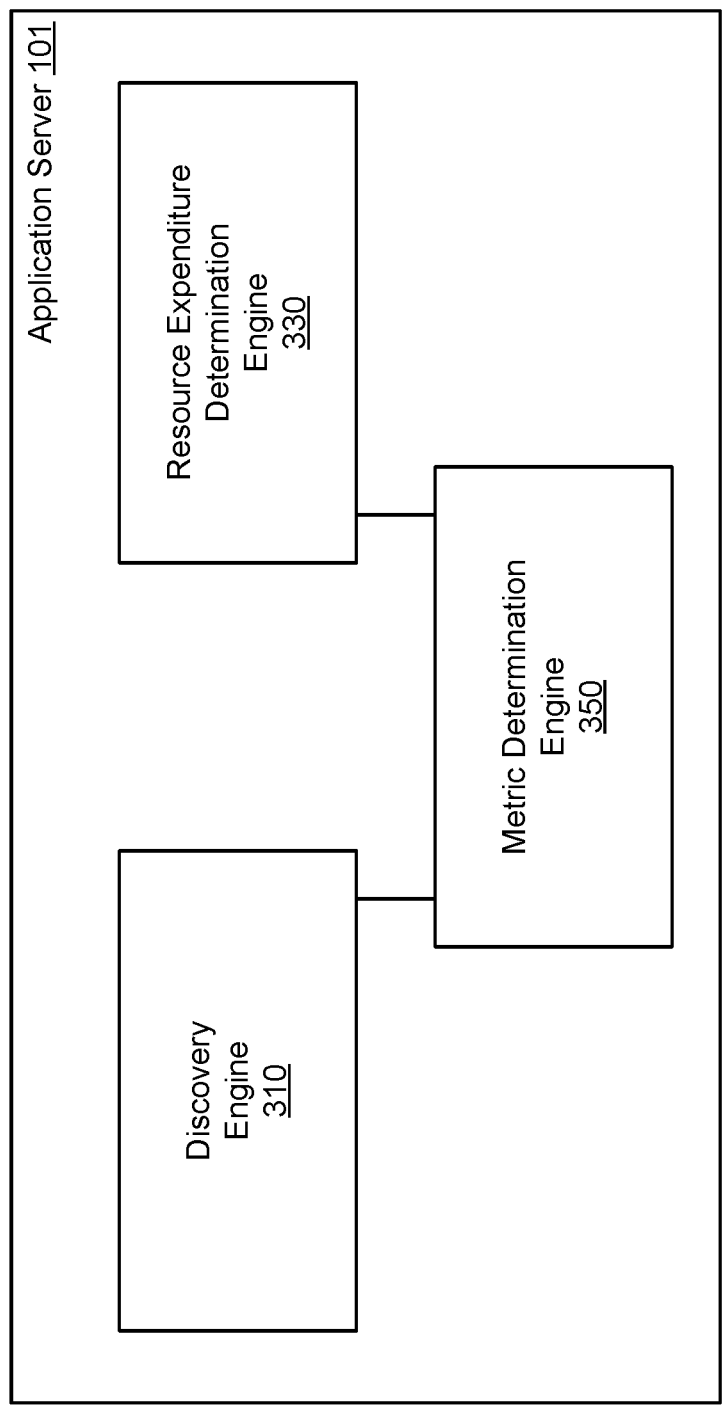
FIG. 3 is a block diagram illustrating an embodiment of a system for determining metrics including resource expenditures of a digital service.

First, an example network environment is described (FIG. 1). Next, a process for determining metrics including resource expenditures of a digital service is described (FIG. 2). Then, a system for determining metrics including resource expenditures of a digital service is described (FIG. 3). Finally, some example graphical user interfaces are described (FIGS. 4-7).

FIG. 1 is a block diagram illustrating a network environment for determining metrics including resource expenditures of a digital service. In the example shown, application server 101 and customer network environment 111 are connected via network 105. Network 105 can be a public or private network. In some embodiments, network 105 is a public network such as the Internet. In various embodiments, application server 101 is a cloud-based application server that provides application services including an information technology operations management (ITOM) cloud service to determine metrics including resource expenditures of a digital service (sometimes simply referred to as "services") running within a customer network such as customer network environment 111. Application server 101 utilizes database 103, which is communicatively connected to application server 101. Application server 101 together with internal server 107, which is located within customer network environment 111, are part of a platform for determining metrics associated with services running within customer network environment 111. For example, using an automatic service discovery service offered by application server 101, an administrator is presented with the discovered services running within customer network environment 111 that utilize one or more of the devices of customer network environment 111 along with associated metrics of the discovered services. In the example shown, example devices of customer network environment 111 include devices 113, 115, 117, and 119.

In some embodiments, database 103 is utilized by application server 101 for determining metrics associated with services as further described herein. For example, database 103 can be used to store discovery data associated with services discovered within a customer network such as customer network environment 111. In some embodiments, database 103 is implemented using one or more databases such as one or more distributed database servers. For example, although shown as a single entity in FIG. 1, database 103 can be implemented as one or more distributed database components connected via network 105 to application server 101.

In some embodiments, database 103 further functions as a CMDB and is used at least in part for managing assets that are under the management of an organization, such as devices 113, 115, 117, and/or 119 of customer network environment 111. For example, each managed asset can be represented as a configuration item (CI) within database 103. In some embodiments, database 103 stores information related to managed assets, such as the hardware and/or software configuration of a computing device, as configuration items.

In some embodiments, application server 101 provides cloud-based services for managing information technology operations including determining metrics of a service within a customer's information technology environment. For example, a service running on the customer's network environment can utilize entities (or devices) within the customer's network infrastructure, such as devices 113, 115, 117, and 119. The connections between processes running on these devices are discovered and used to discover the associated services running within customer network environment 111. Once a service is discovered and associated metrics are determined, the discovered services and associated metrics are provided to the customer via an automatic service discovery service offered by application server 101. The cloud-based discovery service can present the metrics within or alongside visual maps and allow an administrator the ability to make adjustments to and decisions about the services based on the metrics. For example, the administrator may change the schedule of when devices or resources are utilized, change the type of device or resource utilized (downsize the database or storage used), or the like. In some embodiments, application server 101 offers additional cloud services such as a configuration management database (CMDB) service for managing devices and/or configuration items for a customer. In various embodiments, application server 101 stores collected discovery service data in database 103.

In some embodiments, application server 101 provides machine learning functionality to analyze and classify discovery information collected from customer environments. For example, application server 101 can classify and/or score discovered connections and/or processes associated with customer network environment 111 as part of a process in building a set of discovered services running on customer network environment 111. As another example, the application server 101 can determine how a configuration item is being used based on characteristics of the CI such as names of processes running on the CIs. As yet another example, the application server 101 can identify similar processes to group them into a shared resource. A Python fingerprint on different VMs can be used to determine that they can run on a single, shared VM. In various embodiments, the machine learning functionality including machine learning inference servers may be implemented as part of application server 101 and/or implemented as separate components utilized by application server 101.

In some embodiments, customer network environment 111 is an information technology network environment and includes multiple hardware devices including devices 113, 115, 117, and 119, as examples. Devices 113, 115, 117, and 119 correspond to hardware devices and each can be one of a variety of different hardware device types including networking equipment (such as gateways and firewalls), load balancers, servers including application servers and database servers among other servers, and other computing devices including employee laptops and desktops. Devices 113, 115, 117, and 119 are each configured with different hardware and software components, and they generally have the ability to accept or initiate connections between processes associated with the devices and in some instances with a network client located outside of customer network environment 111. For example, a process running on device 113 can establish a connection with a process running on device 115. In various embodiments, customer network environment 111 is connected to network 105. In the example shown, internal server 107, either alone or with the help of additional monitoring modules or agents, is capable of monitoring the processes and/or network connections associated with the devices within customer network environment 111, such as the processes running on devices 113, 115, 117, and 119 and their associated network connections. In various embodiments, the topology of customer network environment 111 can differ and the topology shown in FIG. 1 is just one simplified example.

In the example shown, internal server 107 is an intranet server of customer network environment 111 and the bi-directional connections between internal server 107 and devices 113, 115, 117, and 119 represent the ability for internal server 107 to monitor devices 113, 115, 117, and 119. Depending on the network configuration, the components within customer network environment 111 including internal server 107 and devices 113, 115, 117, and 119 may have full or limited bi-directional or one-directional network connectivity to one another. Internal server 107 can be configured to receive and perform service discovery requests from application server 101 including requests to monitor the processes running and/or connections established within customer network environment 111. The results of the monitoring are sent back to application server 101 where they can be analyzed and evaluated to identify discovered services and determine metrics associated with the discovered services. Although other approaches may be appropriate, in various embodiments, internal server 107 is utilized to perform the monitoring because it resides within customer network environment 111 and has increased access privileges to devices and network data communication that a device outside of customer network environment 111 does not have. For example, internal server 107 can be configured with access permissions allowing it to monitor the data connections between processes running on the devices within customer network environment 111 as well as the ability to monitor what processes are running on the respective devices. In some embodiments, internal server 107 may rely on one or more monitoring agents and/or monitoring components associated with the different devices and/or potential sub-networks (not shown) of customer network environment 111, for example, to properly monitor the data communication and information used for determining metrics of services.

In some embodiments, the functionality of internal server 107 may be implemented by one or more additional devices including by customer devices such as a combination of one or more of devices 113, 115, 117, and/or 119. For example, monitoring agents can be installed on or in parallel to the respective devices to monitor processes and/or network connections associated with different devices. Depending on the network configuration of customer network environment 111, such as the ability to accept certain types of incoming network connections, at least a portion of the functionality performed at internal server 107 can be implemented by application server 101.

Application server 101 and a customer network environment 111 may access one or more third-party service providers 130 via network 105. The third-party service providers may provide dedicated cloud services. For example, a third-party service provider provides a cloud computing platform that can be accessed via an API. The service may be provided on a metered basis, with various rates depending on usage patterns. Thus, knowing resource expenditures associated with the third-party service providers can be helpful for adjusting usage of the third-party service to more optimally use the service to provide the digital service. The disclosed metrics determination techniques can be applied to determine when and how the third-party services are used in connection with providing the digital service.

Although single instances of some components have been shown to simplify the diagram of FIG. 1, additional instances of any of the components shown in FIG. 1 may exist. For example, application server 101 and database 103 may include one or more servers and/or may share servers. In some embodiments, database 103 may not be directly connected to application server 101. For example, database 103 and its components may be replicated and/or distributed across multiple servers and/or components. In some embodiments, components not shown in FIG. 1 may also exist. For example, network clients used to access application server 101 are not shown.

A process for determining metrics including resource expenditures of a digital service running within a customer network such as customer network environment 111 will now be described.

FIG. 2 is a flow diagram illustrating an embodiment of a process for determining metrics including resource expenditures of a digital service. This process may be implemented by an application server such as application server 101 of FIG. 1 or a processor such as processor 802 of FIG. 8.

In the example shown, the process begins by discovering a plurality of configuration items of a computing infrastructure (200). A configuration item (CI) includes a device, computer, software, or service as further described herein. In various embodiments, a CI has an associated record including data such as a manufacturer, vendor, location, etc. One or more CIs can be created or maintained using tables, lists, or forms within the platform, or using an application. A configuration item may be provided by an application server (e.g., 101 of FIG. 1), the customer, or by a third-party. In various embodiments, at least one of the configuration items is provided by a third-party.

The CIs may be obtained from another process such as Discovery by ServiceNow. Discovery finds computers, servers, printers, a variety of IP-enabled devices, and the applications that run on them. It can then update the CIs in a configuration management database (CMDB) with the collected data. An example of Discovery is further described with respect to Discovery Engine 310.

In various embodiments, CIs are discovered using Cloud Discovery by ServiceNow. The information obtained via Cloud Discovery may be used for a variety of purposes, one of which is this process. In other words, Cloud Discovery does not necessarily need to be initiated specifically to perform this process. Instead, Cloud Discovery may be set up to be performed (e.g., according to a schedule) by an administrator and the information obtained during Cloud Discovery may be used for this process as further described herein.

In various embodiments, discovery is unaware of application services and does not create relationships between CIs based on the application service with which CIs are associated. Therefore, unlike the disclosed techniques, conventional techniques based on discovery alone are unable to determine the disclosed metrics for the application services.

The process identifies a subset of the plurality of configuration items utilized to provide a digital service (202). The CIs are the underlying components that make up the digital (application) service. In other words, a group of CIs enables a digital service. The CIs may include applications, services, devices, load balancers, servers, data storage, and various infrastructure components that enable a service. An example of a service is a human resources (HR) portal. In various embodiments, the digital service includes a software application. For example, the software application may allow users to access the HR portal.

In various embodiments, CIs utilized to provide a digital service are identified using Service Mapping (sometimes referred to as Top-down Discovery) by ServiceNow. In various embodiments, Top-down Discovery includes finding and mapping CIs that are part of application services. For example, Top-down Discovery can map a Website business service by showing the relationships between a particular Web server service, a particular server, and a particular database that stores the data for the business service.

In various embodiments, Top-down discovery is performed using discovery patterns to find CIs belonging to the service and connections between the CIs. A pattern refers to a sequence of commands whose purpose is to detect attributes of a CI and its outbound connections. A pattern used for Discovery may also be used for Service Mapping.

Top-down discovery may use an entry point (e.g., a URL, or a combination of an IP address and port) to see where a transaction goes (e.g., URL, to load balancer, to application server, to database server) to discover the application service. Service Mapping starts a mapping process from this point. Entry points vary depending on the nature of the application service. Service Mapping comes with a wide range of preconfigured entry point types that cover many commonly used applications. For example, to map an email application service, an entry point may be an IP address or host name of the email server. The process then identifies dependencies between the CIs based on connections between them. The identified CIs can be stored in the CMDB.

In various embodiments, discovery (200) and service mapping (202) work together to run horizontal discovery first to find CIs, and then top-down discovery to establish the relationships between application services.

The process obtains a plurality of resource expenditures respectively associated with at least a portion of the plurality of configuration items (204). Resource expenditures (or more generally, metrics) for certain/specific CIs may be obtained. Examples of resource expenditures include various aspects of usage such as who has access to the CI, how/what portions of the CI are being used, when the CI is being used, and the duration of usage. In other words, metrics such as changes in integration, code, or infrastructure, forecasting, and weekly trends may be tracked and/or determined. Resource expenditures can be expressed in various forms such as a level of computational usage, billing usage, or the like.

Referring briefly to FIG. 1, resource expenditures for CIs associated with customer network environment 111 can be obtained via monitoring agents installed on or in parallel with devices in the customer network environment. Resource expenditures for CIs associated with third-party service provider 130 can be obtained by querying for this information from the third-party service provider.

In various embodiments, resource expenditures are obtained using Cloud Insights by ServiceNow. Cloud Insights continuously monitors a cloud infrastructure so that a user can identify and take action on resources to optimize operations.

The process associates a subset of the plurality of resource expenditures with the subset of the plurality of configuration items (206). In various embodiments, at least subset of the resource expenditures is shared by a subset of the configuration items including a first configuration item and a second configuration item. Associating the subset of the resource expenditures with the subset of the plurality of configuration items includes apportioning the subset of the resource expenditures among configuration items included in the subset of the configuration items. For example, a service such as a VM can be shared among multiple databases or application services.

By way of non-limiting example, apportioning the subset of the resource expenditures among the subset of the plurality of configuration items includes:
  averaging the resource expenditures among the subset of the plurality of configuration items, or
  assigning a portion of the resource expenditure to each configuration item in the subset of the plurality of configuration items based at least on a usage characteristic of the respective configuration item. For example, the assigned portion is proportional to the usage characteristic of the respective configuration item.

The process aggregates the subset of the plurality of resource expenditures to generate a metric of the digital service (208). In various embodiments, aggregating the subset of the plurality of resource expenditures to generate the metric of the digital service includes combining the subset of the plurality of resource expenditures. In various embodiments, the aggregation can take into account apportionments for information technology (IT) overheads. For example, in larger enterprises IT overheads can be apportioned among different departments or users.

In various embodiments, the generated metric of the digital service is used to determine at least one of (i) a usage pattern of the digital service or (ii) an aggregated total resource cost of providing the digital service.

In various embodiments, the resource expenditure associated with a configuration item of the plurality of configuration items is dynamically obtained in response to a change in a computing infrastructure and/or a change in the configuration item. For example, as application services evolve, CIs may be added or removed or a particular CI may be changed (upgraded or attributes otherwise changed). In response to any such changes, a new resource expenditure may be obtained to accurately reflect the current infrastructure underlying the digital service. In various embodiments, changes are detected by periodically (e.g., according to a schedule) checking for changes in the customer network environment.

In various embodiments, the generated metric of the digital service is output on a graphical user interface (GUI). An example GUI is further described with respect to FIG. 4.

In various embodiments, one or more recommendations based on the generated metric(s) may be determined and output. The recommendations may be specific to a certain CI. For example, machine learning techniques such as metric-based database time series learning may be performed to understand how the CI is being used. In various embodiments, the recommendation includes a grouping of configuration items (e.g., to share a resource) based at least on a similarity between members of the grouping of configuration items. In various embodiments, the recommendation is associated with service migration. Examples of recommendations are further described with respect to FIGS. 6 and 7.

The process will now be described using the example of a digital (application) service that provides an HR portal. The configuration items are discovered to be: a cloud service storage to store employee records, a virtual machine including an application server to provide computational functionality, and a load balancer to redirect traffic. Metrics of the human resources portal may include usage patterns of the cloud service storage, CPU usage of the virtual machine, and load balancer traffic (e.g., time of day/week when more usage is observed such as at the end of the month), and the like. Metrics including resource expenditures associated with the digital service may be determined using the disclosed techniques. For example, a cost score may be a representation of a resource expenditure such as dollar amount, energy usage, etc. For the HR portal, the costs are: a cloud service storage with a cost score of 0.5, a CPU with a cost score of 12, and a load balancer with a cost score of 0.25. The cloud service storage is shared between the HR portal and another application service, and the apportioning determines that about 50% is used by the HR portal so the cost score is updated to 0.25. Thus, the total resource expenditure score in this example HR portal is 12.5.

FIG. 3 is a block diagram illustrating an embodiment of a system for determining metrics including resource expenditures of a digital service. The system shown here is an example of the application server 101 of FIG. 1. The application server includes a discovery engine 310, a resource expenditure determination engine 330, and a metric determination engine 350. The application server is configured to perform the techniques disclosed herein including the process of FIG. 2.

The discovery engine 310 is configured to discover CIs of a computing infrastructure. In various embodiments, the discovery engine uses probes, sensors, and patterns to find CIs. Probes and sensors include (computer) program scripts that collect and process data on a host and then update the CMDB. In various embodiments, probes explore or investigate CIs in a customer network environment, and sensors parse the data returned from the probes.

A pattern refers to a sequence of commands whose purpose is to detect attributes of a CI (and outbound connections as further described herein). In various embodiments, patterns may be pre-configured. Patterns include a series of one or more operations that collect data on a host, process the data, and update the CMDB. In various embodiments, unlike probes and sensors, patterns are executed in the later stages of a Horizontal Discovery process further described herein. Probes, sensors, and patterns may have default settings or be customized to find different information. For example, parameters can be configured to control the behavior of a particular probe.

The discovery engine may perform Horizontal Discovery, which maps an infrastructure of a customer's network environment, and/or Cloud Discovery (also called Top-Down Discovery), which maps a customer's cloud-based infrastructure.

Horizontal Discovery finds configuration items on a customer network environment (e.g., 111 of FIG. 1), and populates the CMDB with the discovered configuration items. The discovery engine creates/identifies direct relationships between CIs. An example of a relationship between an application CI and a computer CI is a "runs on" relationship indicating that the application CI runs on a particular computer CI. The discovery engine may use IP addresses to discover the infrastructure of a customer's network environment.

In various embodiments, horizontal discovery includes one or more of the following phases: scanning, classification, identification, and exploration. Scanning is performed by sending a probe to the network (e.g., a customer network environment 111 of FIG. 1) to determine whether commonly used ports are open and if these ports can respond to queries. For example, if the probe finds a device that responds on port 135, the discovery engine knows that it is a Windows® server. If the discovery engine finds devices or computers, it sends additional probes to find the type of device or the operating system on the device. Referring to the same example, upon determining that a device is a Windows® server, the discovery engine sends a Windows® Management Instrumentation (WMI) probe to the Windows® server to detect the operating system. The discovery engine may use records (called classifiers), which specify the trigger probe or probes that run during the next two phases. If patterns are being used, the classifier specifies a trigger probe that in turn launches a pattern.

In an identification phase, the discovery engine tries to gather more information about the device and then tries to determine if a CI for the device exists in the CMDB. The discovery engine then uses additional probes, sensors, and identifiers to update existing CIs in the CMDB or create new ones. Identifiers, also known as identification rules, specify the attributes that the probes look at when reconciling data with the CIs in the CMDB. If patterns are being used, the discovery engine uses the appropriate identification rule for the CI type specified in the pattern.

In an exploration phase, an identifier launches additional probes configured in the classifier. These probes may be designed as exploration probes to gather additional information about the device such as applications running on the device, and additional attributes such as memory, network cards, drivers, or the like. The discovery engine then creates relationships between applications and devices and between applications. If patterns are being used, the operations in the pattern perform the exploration of the CI.

In various embodiments, a management, instrumentation, and discovery (MID) Server, which (continuously) queries the instance for probes to run, executes the instructions in the probe or in the pattern that the probe specifies. The MID Server then returns the results to the instance, where sensors process the results. In various embodiments, the MID Server does not retain any Discovery information.

Cloud Discovery enables users (e.g., IT administrators) to collect detailed information about their cloud-based infrastructure. Cloud Discovery finds resources in various third-party cloud service providers by collecting logical datacenters associated with an account, as well as any subaccounts.

One type of Cloud Discovery is service account-based discovery, which finds resources in a service account. In various embodiments, service account-based discovery collects metadata using the cloud provider's APIs, then populates a Machine Instance CMDB table with basic attributes. Service account-based discovery has visibility into tags, which helps data reporting and workflow automation. For example, cloud events can be used to trigger discovery on-demand on target services. This mechanism helps Cloud Discovery to identify changes and automatically update the CMDB.

Another type of Cloud Discovery is IP-based discovery, which uses metadata collected from service account-based discovery to collect more detailed information. For example, information on installed software, process information, TCP/IP connections, etc. can be collected.

In various embodiments, Cloud Discovery uses discovery patterns to query devices and applications and collect the information about them. A pattern is a sequence of commands used to detect attributes of a CI and its outbound connections. Notifications and alerts from the cloud environment can be detected. These events are sent via a REST connection, and processed to update CIs in the CMDB accordingly.

In various embodiments, Cloud Discovery uses a MID Server to access devices and applications in the cloud. In various embodiments, a MID server includes an application that runs on a server in a local network (e.g., internal server 107 of FIG. 1) to facilitate communication and data movement between a single instance of application server 101 and external applications, data sources, and services.

In various embodiments, the discovery engine 310 is configured to identify a subset of the CIs utilized to provide a digital service, e.g., those CIs that are the underlying components that make up the digital (application) service. For example, the discovery engine performs 202 of FIG. 2.

The resource expenditure determination engine 330 is configured to obtain resource expenditures associated with CIs. In various embodiments, resource expenditures include at least one of (i) a usage pattern of a configuration item of the plurality of configuration items or (ii) a computational cost of a configuration item of the plurality of configuration items.

The metric determination engine 350 is configured to use the resource expenditures to generate a metric of the digital service. In various embodiments, the metric determination engine 350 may associate a subset of the resource expenditures with a subset of the CIs, e.g., where CIs share resource expenditures, and the resource expenditures will be apportioned among the CIs to provide an accurate metric. Alternatively, this function may be performed by the resource expenditure determination engine 330 or by both in cooperation.

Figure 4:
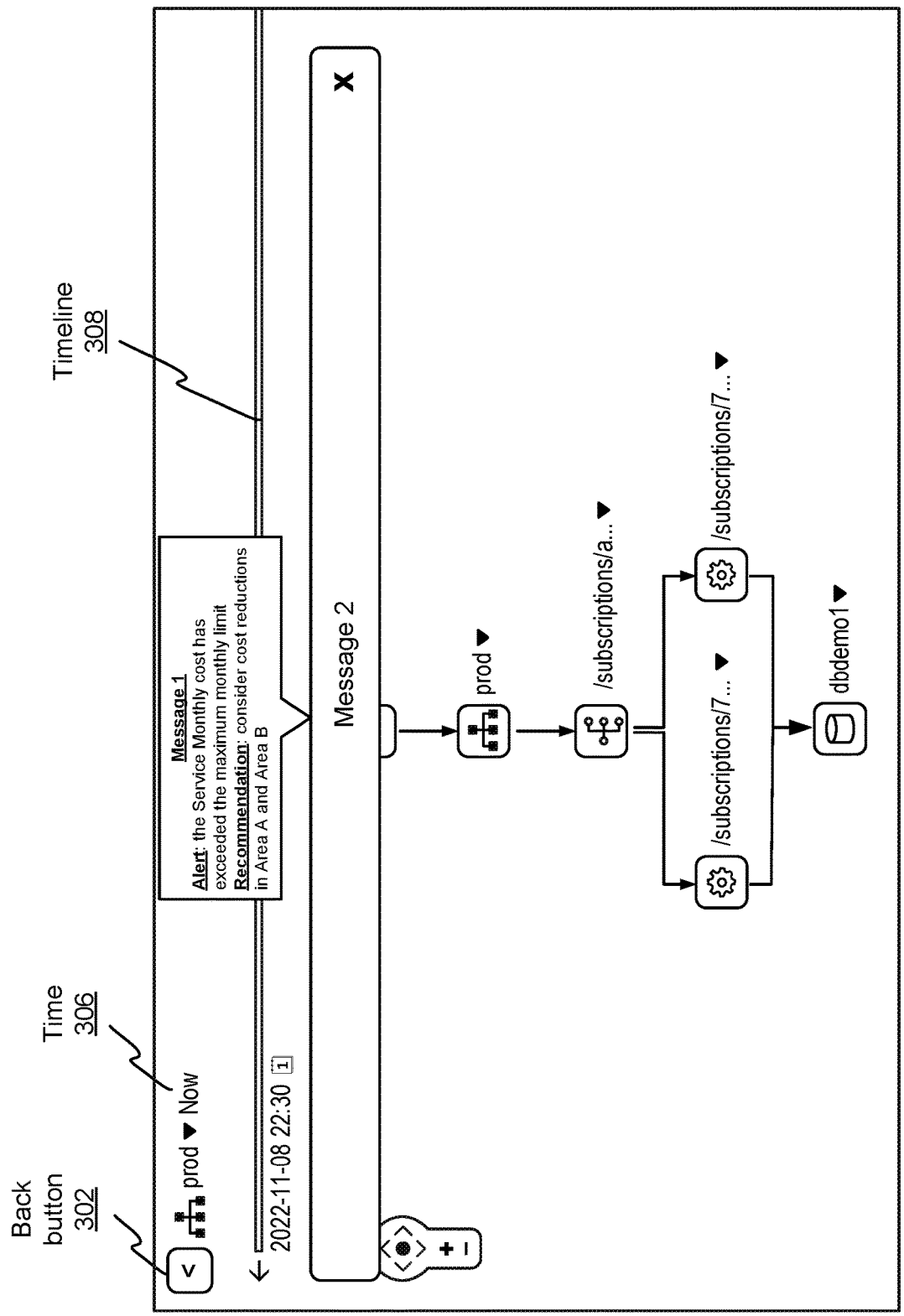
FIG. 4 is a diagram illustrating an embodiment of an automatically generated visual service map for an automatically discovered service.

FIG. 4 is a diagram illustrating an embodiment of an automatically generated visual service map for an automatically discovered service. This GUI shows an example of a computing infrastructure represented by a service map. Each configuration item (CI) is represented by a symbol in the map. For example, the CIs here are "prod," "/subscriptions/a," "/subscriptions/7," "/subscriptions/7," and "dbdemo1." Each type of CI may be represented by a different icon. A back button 302 allows a user to leave the current page.

A recommendation based on metrics of a digital service determined according to the process of FIG. 1 is shown as Message 1, which is an alert that the Service Monthly cost has exceeded a monthly limit. In this example, the message also includes a recommendation to consider cost reductions in Area A and Area B. This recommendation can be generated by comparing the metric of the digital service with a threshold (the monthly limit). The recommendation to consider cost reductions in specific areas may also be based on the determination of CIs or groups of CIs with high resource expenditures (e.g., as compared with a threshold or statistically determined). In addition, or alternatively, at least a portion of the contents of Message 1 may be displayed in the form of a pop-up window (Message 2).

The GUI may be interactive and output historical data associated with at least one of: the computing infrastructure or the generated metric of the digital service. Time selector 306 shows that the current view is the present moment in time. The user can navigate to earlier times by selecting component 306 or by scrolling along timeline 308.

FIG. 5 is a diagram illustrating an embodiment of a generated metric of a digital service. The metric in this example shows each CI (first column) and its associated monthly cost. Additional details such as the monthly billing date, service account, region, and cloud category are also shown in this example.

FIG. 6 is a diagram illustrating an embodiment of a rightsizing recommendation for a digital service. A rightsizing recommendation may be based on how much CPU or memory is effectively being used and recommending an appropriate CPU or memory size to accommodate the need. In other words, a user can use the recommendation to reduce usage of a resource to maintain an expected level of performance/service.

In this example, each CI (first column) is shown along with an associated provider, size (e.g., version/release), recommended size, and monthly savings if the switch is made from the current size to the recommended size.

FIG. 7 is a diagram illustrating an embodiment of a time of use recommendation for a digital service. The time of use (sometimes referred to as business hour) recommendation may be based on determined metrics with respect to when and how a CI is being used. In this example, each CI (first column) is shown with an associated provider, region, recommended schedule, and monthly savings if the switch is made from the current schedule to the recommended schedule.

Figure 8:
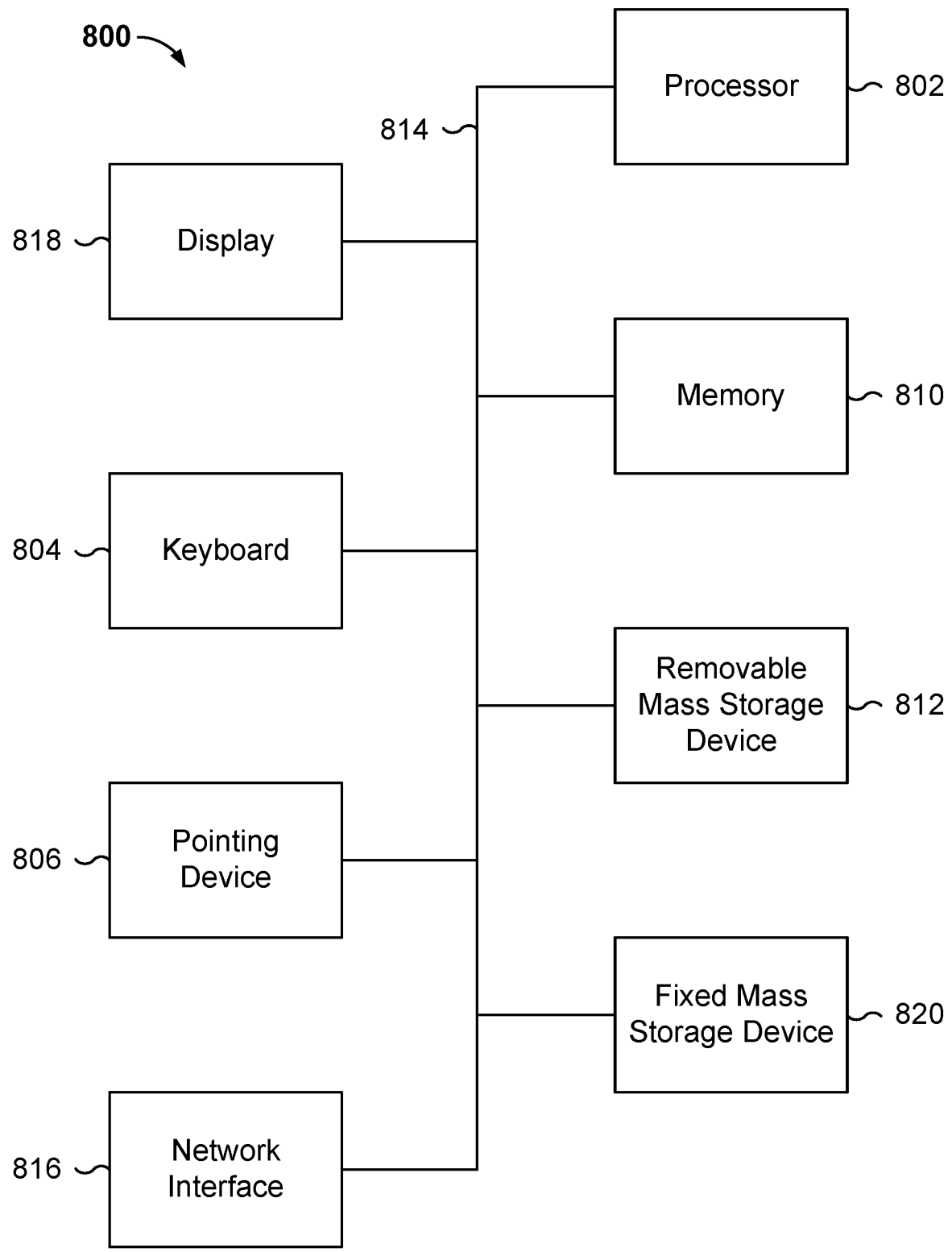
FIG. 8 is a functional diagram illustrating a programmed computer system for determining metrics including resource expenditures of a digital service in accordance with some embodiments.

FIG. 8 is a functional diagram illustrating a programmed computer system for determining metrics including resource expenditures of a digital service in accordance with some embodiments. As will be apparent, other computer system architectures and configurations can be used to determine metrics including resource expenditures of a digital service. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818). In some embodiments, processor 802 includes and/or is used to execute/perform the processes described with respect to FIG. 2.

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data and objects used by the processor 802 to perform its functions (e.g., programmed instructions). For example, memory 810 can include any suitable computer-readable storage media, described below, depending on whether, for example, data access needs to be bi-directional or uni-directional. For example, processor 802 can also directly and very rapidly retrieve and store frequently needed data in a cache memory (not shown).

A removable mass storage device 812 provides additional data storage capacity for the computer system 800, and is coupled either bi-directionally (read/write) or uni-directionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storage 812, 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    discovering a plurality of configuration items of a computing infrastructure;
    identifying a subset of the plurality of configuration items utilized to provide a digital service;
    obtaining a plurality of resource expenditures respectively associated with at least a portion of the plurality of configuration items, wherein:
        the plurality of resource expenditures includes a resource expenditure associated with a virtual machine shared by the subset of the plurality of configuration items;
        at least one of the plurality of resource expenditures is reported by a provider different from a platform managing the computing infrastructure; and
        at least a subset of the plurality of resource expenditures is shared by the subset of the plurality of configuration items including a first configuration item and a second configuration item;
    associating the subset of the plurality of resource expenditures with the subset of the plurality of configuration items; and
    aggregating the subset of the plurality of resource expenditures to generate a metric of the digital service.

2. The method of claim 1, wherein the plurality of configuration items includes at least one of: a device, a computer, or a service.

3. The method of claim 1, wherein at least one of the plurality of configuration items is provided by a third-party different from an application server and a client.

4. The method of claim 1, wherein the digital service includes an application cloud service.

5. The method of claim 1, wherein the plurality of resource expenditures is used to determine at least one of (i) a usage pattern of a configuration item of the plurality of configuration items or (ii) computational cost of the configuration item of the plurality of configuration items.

6. The method of claim 1, wherein:
    associating the at least the subset of the plurality of resource expenditures with the subset of the plurality of configuration items includes apportioning the at least the subset of the plurality of resource expenditures among configuration items included in the subset of the plurality of configuration items.

7. The method of claim 6, wherein apportioning the at least the subset of the plurality of resource expenditures among the subset of the plurality of configuration items includes averaging the at least the subset of the plurality of resource expenditures among the configuration items included in the subset of the plurality of configuration items.

8. The method of claim 6, wherein apportioning the at least the subset of the plurality of resource expenditures among the subset of the plurality of configuration items includes assigning a portion of a resource expenditure of the at least the subset of the plurality of resource expenditures to each of the configuration items in the subset of the plurality of configuration items based at least on a usage characteristic of the respective configuration item.

9. The method of claim 1, wherein aggregating the subset of the plurality of resource expenditures to generate the metric of the digital service includes combining the subset of the plurality of resource expenditures.

10. The method of claim 1, wherein the generated metric of the digital service includes at least one of (i) a usage pattern of the digital service or (ii) an aggregated total resource cost of providing the digital service.

11. The method of claim 1, further comprising dynamically obtaining a resource expenditure associated with a configuration item of the plurality of configuration items in response to a change in the computing infrastructure.

12. The method of claim 1, further comprising dynamically obtaining a resource expenditure associated with a configuration item of the plurality of configuration items in response to a change in the configuration item.

13. The method of claim 1, further comprising outputting the generated metric of the digital service on a graphical user interface.

14. The method of claim 13, wherein the graphical user interface is interactive and outputs historical data associated with at least one of: the computing infrastructure or the generated metric of the digital service.

15. The method of claim 1, further comprising determining a recommendation based at least on the generated metric.

16. The method of claim 15, wherein the recommendation includes a grouping of configuration items based at least on a similarity between members of the grouping of the configuration items.

17. The method of claim 15, wherein the recommendation is associated with service migration.

18. A system, comprising:
a processor configured to:
  discover a plurality of configuration items of a computing infrastructure;
  identify a subset of the plurality of configuration items utilized to provide a digital service;
  obtain a plurality of resource expenditures respectively associated with at least a portion of the plurality of configuration items, wherein:
    the plurality of resource expenditures includes a resource expenditure associated with a virtual machine shared by the subset of the plurality of configuration items;
    at least one of the plurality of resource expenditures is reported by a provider different from a platform managing the computing infrastructure; and
    at least a subset of the plurality of resource expenditures is shared by the subset of the plurality of configuration items including a first configuration item and a second configuration item;
  associate the subset of the plurality of resource expenditures with the subset of the plurality of configuration items; and
  aggregate the subset of the plurality of resource expenditures to generate a metric of the digital service; and
a memory coupled to the processor and configured to provide the processor with instructions.

19. The system of claim 18, wherein the plurality of resource expenditures is used to determine at least one of (i) a usage pattern of a configuration item of the plurality of configuration items or (ii) computational cost of the configuration item of the plurality of configuration items.

20. A computer program product embodied in a non-transitory computer readable medium and comprising computer instructions for:
discovering a plurality of configuration items of a computing infrastructure;
identifying a subset of the plurality of configuration items utilized to provide a digital service;
obtaining a plurality of resource expenditures respectively associated with at least a portion of the plurality of configuration items, wherein:
  the plurality of resource expenditures includes a resource expenditure associated with a virtual machine shared by the subset of the plurality of configuration items;
  at least one of the plurality of resource expenditures is reported by a provider different from a platform managing the computing infrastructure; and
  at least a subset of the plurality of resource expenditures is shared by the subset of the plurality of configuration items including a first configuration item and a second configuration item;
associating the subset of the plurality of resource expenditures with the subset of the plurality of configuration items; and
aggregating the subset of the plurality of resource expenditures to generate a metric of the digital service.

21. The method of claim 1, wherein apportioning the at least the subset of the plurality of resource expenditures among the configuration items included in the subset of the plurality of configuration items includes determining a relative level of consumption by each configuration item of the at least the subset of the plurality of resource expenditures.

* * * * *